United States Patent [19]
Dixon et al.

[11] Patent Number: 5,436,941
[45] Date of Patent: Jul. 25, 1995

[54] SPREAD SPECTRUM SPECTRAL DENSITY TECHNIQUES

[75] Inventors: Robert C. Dixon, Palmer Lake, Colo.; Scott R. Bullock, South Jordan, Utah

[73] Assignee: Omnipoint Corporation, Colorado Springs, Colo.

[21] Appl. No.: 146,499

[22] Filed: Nov. 1, 1993

[51] Int. Cl.[6] .................................................. H04B 1/707
[52] U.S. Cl. ........................................ 375/206; 380/46
[58] Field of Search ............................... 375/1; 380/46

[56] References Cited

U.S. PATENT DOCUMENTS

| | | | |
|---|---|---|---|
| 3,934,203 | 1/1976 | Schiff | 325/65 |
| 4,163,944 | 8/1979 | Chambers et al. | 325/446 |
| 4,425,661 | 10/1984 | Moses et al. | 375/1 |
| 4,567,588 | 1/1986 | Jerrim | 370/18 |
| 4,630,283 | 12/1986 | Schiff | 375/1 |
| 4,672,658 | 6/1987 | Kavehrad et al. | 379/63 |
| 4,703,474 | 10/1987 | Foschini et al. | 370/18 |
| 4,724,435 | 2/1988 | Moses et al. | 340/870 |
| 4,759,034 | 7/1988 | Nagazumi | 375/1 |
| 4,774,715 | 9/1988 | Messenger | 375/1 |
| 4,805,208 | 2/1989 | Schwartz | 379/93 |
| 4,811,357 | 3/1989 | Betts et al. | 375/1 |
| 4,837,786 | 6/1989 | Gurantz et al. | 370/20 |
| 4,864,589 | 9/1989 | Endo | 375/1 |
| 4,901,307 | 2/1990 | Gilhousen et al. | 370/18 |
| 4,943,973 | 7/1990 | Werner | 375/1 |
| 4,984,247 | 1/1991 | Kaufmann et al. | 375/1 |
| 5,016,255 | 5/1991 | Dixon et al. | 375/1 |
| 5,022,047 | 6/1991 | Dixon et al. | 375/1 |
| 5,023,887 | 6/1991 | Takeuchi et al. | 375/1 |
| 5,025,452 | 6/1991 | Sohner et al. | 375/1 |
| 5,073,899 | 12/1991 | Collier et al. | 375/1 |
| 5,081,642 | 1/1992 | O'Clock, Jr. et al. | 375/1 |
| 5,146,471 | 9/1992 | Cowart | 375/1 |
| 5,150,377 | 9/1992 | Vannucci | 375/1 |
| 5,157,686 | 10/1992 | Omura et al. | 375/1 |
| 5,166,952 | 11/1992 | Omura et al. | 375/1 |
| 5,179,571 | 1/1993 | Schilling | 375/1 |
| 5,181,225 | 1/1993 | Neeser et al. | 375/1 |
| 5,228,056 | 7/1993 | Schilling | 375/1 |
| 5,253,268 | 10/1993 | Omura et al. | 375/1 |
| 5,274,665 | 12/1993 | Schilling | 375/1 |
| 5,280,537 | 1/1994 | Sugiyama et al. | 375/1 |
| 5,291,516 | 3/1994 | Dixon et al. | 375/1 |

OTHER PUBLICATIONS

Mark C. Austin, *Quadrature Overlapped Raised-Cosine Modulation*, IEEE Transactions on Communications, vol. Com-29, No. 3, Mar. 1981.

*Primary Examiner*—David C. Cain
*Attorney, Agent, or Firm*—Lyon & Lyon

[57] ABSTRACT

A spread-spectrum communication system in which the energy output is more smoothly distributed than the length of the pseudo-random code would otherwise indicate. A spread-spectrum communication system in which the code sequence is pseudo-randomly inverted on data-bit boundaries, so that the code sequence appears longer, for energy spreading, than it otherwise would appear.

20 Claims, 1 Drawing Sheet

SPREAD SPECTRUM SPECTRAL DENSITY TECHNIQUES

BACKGROUND OF THE INVENTION

1. Field of the Invention

This invention relates to spectral density techniques for use with spread-spectrum modulation.

2. Description of Related Art

In direct-sequence spread-spectrum communication, a data stream may be modulated with a pseudo-random code, so that the energy of the modulated signal is spread over a bandwidth which is larger than the bandwidth of the data stream. Present regulations, for communication in a band of electromagnetic spectrum in which spread-spectrum communication is allowed, generally require all parts of the modulated signal to be no more than +8 db power over the signal average, measured over a 3 KHZ resolution bandwidth. In a spread-spectrum system which uses relatively short pseudo-random codes, the modulated signal may at times not be sufficiently random to meet the regulatory requirement. Accordingly, it would be advantageous to generate a spread-spectrum signal using relatively short pseudo-random codes which meets the regulatory requirement.

SUMMARY OF THE INVENTION

The invention provides a spread-spectrum communication system in which the energy output is more smoothly distributed than the length of the pseudo-random code would otherwise indicate. In particular, the invention provides a spread-spectrum communication system in which the code sequence is pseudo-randomly inverted on data-bit boundaries, so that the code sequence appears longer, for energy spreading, than it otherwise would appear.

DESCRIPTION OF THE PREFERRED EMBODIMENT

Figure 1:
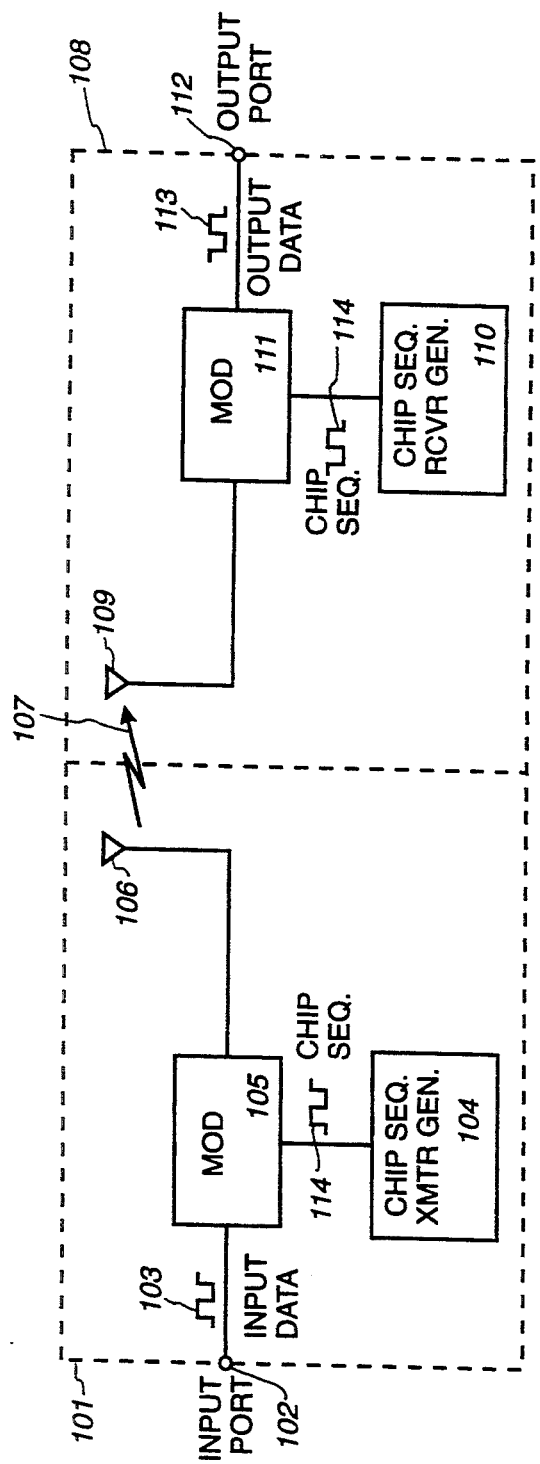
FIG. 1 shows a block diagram of a spread-spectrum communication transmitter and receiver.

FIG. 1 shows a block diagram of a spread-spectrum communication transmitter and receiver.

A spread-spectrum transmitter 101 may comprise an input port 102 for input data 103, a chip sequence transmitter generator 104, a modulator 105, and a transmitting antenna 106 for transmitting a spread-spectrum signal 107. A spread-spectrum receiver 108 may comprise a receiver antenna 109, a chip sequence receiver generator 110, a demodulator 111, and an output port 112 for output data 113. In a preferred embodiment, a single chip sequence 114 is identically generated by both the transmitter generator 104 and the receiver generator 110, and appears essentially random to others not knowing the spreading code upon which it is based. An extensive discussion of spread-spectrum communication, spreading codes, and chip sequences, may be found in R. Dixon, SPREAD SPECTRUM SYSTEMS (1984).

Figure 2:
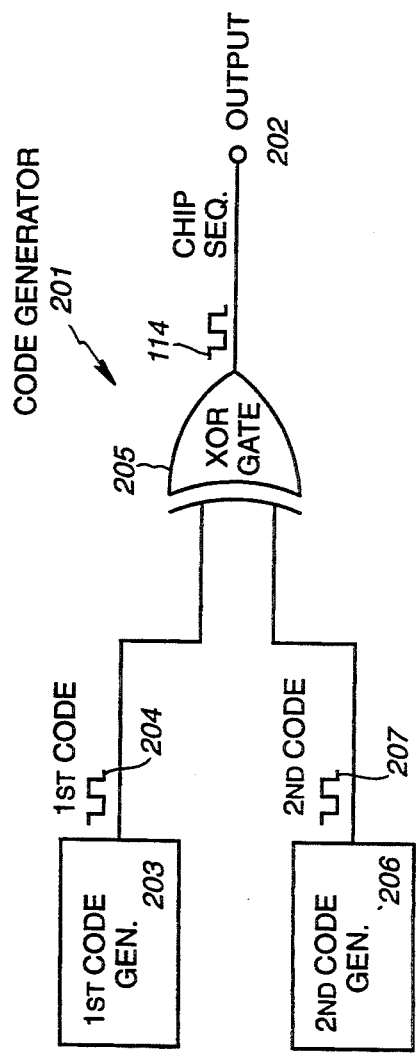
FIG. 2 shows a block diagram for a pseudo-random code generator for use in a spread-spectrum communication system.

FIG. 2 shows a block diagram for a pseudo-random code generator for use in a spread-spectrum communication system.

The transmitter generator 104 and the receiver generator 110 may comprise a code generator 201, having an output 202 for the chip sequence 114. In a preferred embodiment, the chip sequence 114 may comprise a 63-chip maximal-length pseudo-random chip sequence, which is pseudo-randomly inverted by XOR-ing with a second chip sequence at each data bit boundary.

The code generator 201 comprises a first generator 203 which generates a first code 204. In a preferred embodiment, the first code 204 may comprise a 63-chip linear maximal-length code. An output from the first generator 203 is coupled to a first input of an XOR gate 205. A second generator 206 is clocked at the same rate as the data stream, and generates a second code 207, which is coupled to a second input of the XOR gate 205. The output of the XOR gate 205 is coupled to the output 202 for the code generator 201.

The code generator 201 thus generates a complete sequence of the first code 204 for each data bit, but pseudo-randomly inverts the first code 204 by XOR-ing it with the second code 207 at each data bit boundary (i.e., each full data bit is modulated either with the full length of the first code 204 or with the full length of the inverse of the first code 204).

It will be clear to those of ordinary skill in the art, after perusal of this application, that the effect of pseudo-randomly inverting the first code 204 at each data bit boundary is to more smoothly distribute the energy of the modulated signal over the bandwidth it occupies. In a preferred embodiment, the first code 204 is $2^N-1$ chips long, e.g., 63 chips long, the second code 207 is $2^P-1$ chips long, e.g., 63 chips long, and the modulated signal has about 4 to 7 db maximum power over the signal average, measured in a 3 KHz resolution bandwidth.

Alternative Embodiments

While preferred embodiments are disclosed herein, many variations are possible which remain within the concept and scope of the invention, and these variations would become clear to one of ordinary skill in the art after perusal of the specification, drawings and claims herein.

For example, information which is transmitted from transmitter to receiver is referred to herein as "data" but it would be clear to those of ordinary skill in the art that these data could comprise both data and error-correcting codes, control information, or other signals, and that this would be within the scope and spirit of the invention.

We claim:

1. A method, comprising the steps of
   receiving a plurality of data bits;
   generating a pseudo-random chip sequence and an inverse of said pseudo-random chip sequence;
   pseudo-randomly selecting one or the other of said pseudo-random chip sequence or its inverse;
   generating a new chip sequence in response to said selection; and
   modulating each one of said plurality of data bits with said new chip sequence.

2. A method as in claim 1, wherein said step of pseudo-randomly selecting comprises the steps of
   generating a second pseudo-random chip sequence, said second pseudo-random chip sequence comprising one chip for each data bit; and
   generating said new chip sequence in response to a boolean operation performed on said original pseudo-random chip sequence and said second pseudo-random chip sequence.

3. A method, comprising the steps of
receiving a plurality of data bits;
receiving a pseudo-random chip sequence; and
generating a spread-spectrum signal in response to said plurality of data bits and said pseudo-random chip sequence, said spread-spectrum signal having a smoother spectral energy density than that of a spread-spectrum signal generated by direct-sequence modulation of said plurality of data bits with said pseudo-random chip sequence.

4. A method as in claim 3, wherein said pseudo-random chip sequence is a 63-chip maximal length code.

5. A method, comprising the steps of
receiving a plurality of data bits;
receiving a pseudo-random chip sequence; and
generating a spread-spectrum signal in response to said plurality of data bits and a transformation of said pseudo-random chip sequence, said spread-spectrum signal having a smoother spectral energy density than that of a spread-spectrum signal generated by direct-sequence modulation of said plurality of data bits with said pseudo-random chip sequence.

6. A method as in claim 5, wherein said pseudo-random chip sequence is a 63-chip maximal length code.

7. A method as in claim 5, wherein said transformation of said pseudo-random chip sequence is an inverse of said pseudo-random chip sequence.

8. A method, comprising the steps of
receiving a plurality of data bits;
generating a first pseudo-random chip sequence at a rate of more than one chip per bit;
generating a second pseudo-random chip sequence at a rate of no more than one chip per bit;
generating a signal in response to said first and second pseudo-random chip sequences; and
spread-spectrum modulating said plurality of data bits with said signal.

9. A method as in claim 8, wherein said step of generating a signal comprises XOR-ing said first and second pseudo-random chip sequences.

10. A method as in claim 8, wherein said first pseudo-random chip sequence is a 63-bit maximal length code.

11. A method as in claim 8, wherein said second pseudo-random chip sequence has a rate of exactly one chip per bit.

12. A code generator for use in a spread spectrum communication system comprising:
a first pseudo-noise generator having as an output a first chip sequence,
a second pseudo-noise generator having as an output a second chip sequence,
an XOR gate, said XOR gate having as inputs said first chip sequence and said second chip sequence, and having as an output either said first chip sequence or an inverse of said first chip sequence in response to said second chip sequence.

13. The code generator of claim 12 further comprising a modulator comprising a first and second input, said output of said XOR gate coupled to said first input, and a data signal coupled to said second input.

14. The code generator of claim 13 wherein said data signal comprises a series of data bits clocked at a predefined rate, and said second chip sequence comprises a series of chips, wherein said second chip sequence is clocked at said predefined rate.

15. The code generator of claim 13 wherein a signal output from said modulator is coupled to a transmitter, and said transmitter transmits said modulator signal over a communication channel.

16. A method of generating a spread spectrum signal comprising the steps of
receiving a plurality of data bits;
generating a first pseudo-random chip sequence,
generating at selected intervals either a second pseudo-random chip sequence or an inverse of said second pseudo-random chip sequence in response to said first pseudo-random chip sequence, and forming a modulation signal thereby;
modulating each one of said plurality of data bits with said modulation signal.

17. A method as in claim 16, wherein said selected intervals correspond to boundaries of said data bits.

18. A spread spectrum code generator comprising:
a first pseudo-noise generator capable of outputting a first chip sequence,
a second pseudo-noise generator capable of outputting a second chip sequence,
means for selecting either said first chip sequence or an inverse of said first chip sequence in response to said second chip sequence, and generating an output signal thereby.

19. A spread spectrum code generator as in claim 18, wherein said means for selecting comprises and XOR gate having as inputs said first chip sequence and said second chip sequence.

20. A spread spectrum code generator as in claim 18 wherein said output signal is modulated with a data signal comprising data bits clocked at a predefined rate, and said second chip sequence has a chip rate equal to said predefined rate.

* * * * *